United States Patent [19]

Takizawa et al.

[11] Patent Number: 5,191,483
[45] Date of Patent: Mar. 2, 1993

[54] INSTALLATION OF OPTICAL COMPONENT IN OPTICAL DEVICE

[75] Inventors: Yasuo Takizawa, Saitama; Shinyu Ikeda, Tokyo; Masataka Nishiyama, Tokyo; Takaaki Yoshinari, Tokyo; Masakuni Suwashita, Tokyo, all of Japan

[73] Assignee: Asahi Kogaku Kogyo Kabushiki Kaisha, Tokyo, Japan

[21] Appl. No.: 756,062

[22] Filed: Sep. 6, 1991

[30] Foreign Application Priority Data

Sep. 7, 1990 [JP] Japan ................................ 2-238279

[51] Int. Cl.5 ............................................ G02B 7/02
[52] U.S. Cl. ...................................... 359/819; 359/820
[58] Field of Search ........................ 359/811, 819, 820

[56] References Cited

U.S. PATENT DOCUMENTS

| 4,046,458 | 9/1977 | Smulders | 359/819 |
| 4,303,306 | 12/1981 | Ookawa | 359/819 |
| 4,723,833 | 2/1988 | Yamada | 359/820 |
| 4,737,017 | 4/1988 | Nagasaka | 359/819 |
| 4,740,057 | 4/1988 | Dezso | 359/819 |
| 4,778,253 | 10/1988 | Siga | 359/819 |

Primary Examiner—Eugene R. LaRoche
Assistant Examiner—A. Zarabian
Attorney, Agent, or Firm—Kane, Dalsimer, Sullivan, Kurucz, Levy, Eisele and Richard

[57] ABSTRACT

Installing of an optical component on a housing case. One side of the optical component to be installed is abutted to a reference surface formed on the housing case for positional regulation thereof. A heat-fusible protrusion is formed on the housing case at the position which is opposed to the reference surface and has a vertical length enough to be beyond the top surface of the optical component seated on the housing case. Heat is applied to at least a part of the fusible protrusion to be fused onto the optical component with abutting the one side of the optical component to the reference surface. The fused portion is let to be hardened for regulating the position of the other end of the optical component, whereby the optical component is fixed onto the housing case with regulating the posture thereof in the direction crossing to the reference surface.

20 Claims, 9 Drawing Sheets

F I G. 9A
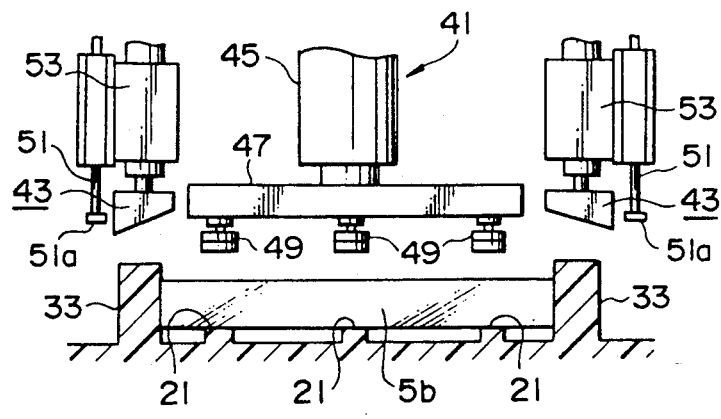
F I G. 9B
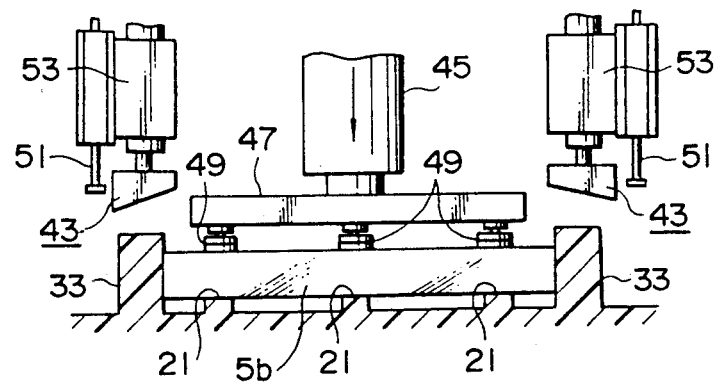
F I G. 9C
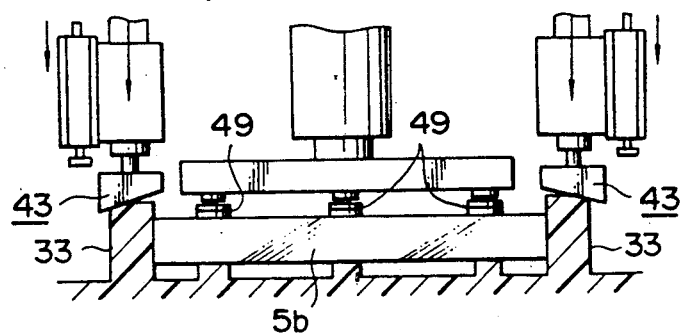

FIG. IIA
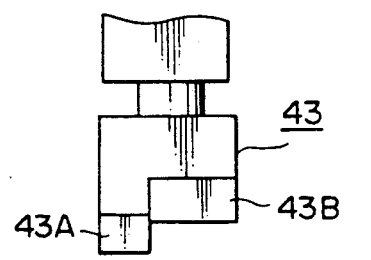
FIG. IIB
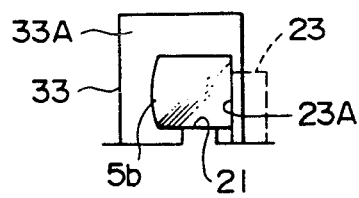
FIG. IIC
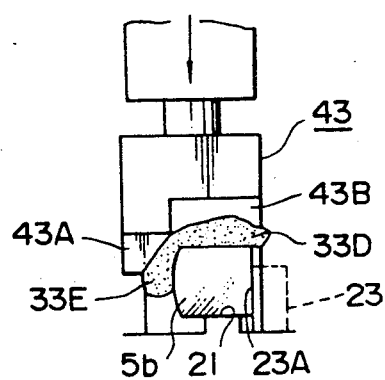

INSTALLATION OF OPTICAL COMPONENT IN OPTICAL DEVICE

BACKGROUND OF THE INVENTION

The present invention relates to installation of an optical component such as a lens in an optical device such as a light scanning device.

In the art, there has been known a laser beam scanning device which is applied to a laser beam printer and so on. In the conventional laser beam scanning device, such an optical component as an fθ lens which is employed for making the scanning speed of laser beam constant is installed, for example, as illustrated in FIGS. 12 and 13.

That is, the fθ lenses A and B are placed at their predetermined positions by means of a plurality of protrusions C formed on a housing case G of the laser beam scanning device, and fixed there by virtue of biasing force of a plurality of leaf springs D, each connected by a screw F to a boss E planted on the housing case G.

With this conventional installation, however, the biasing force of the leaf springs D is continuously applied to certain portions of the lenses as stress, and therefore it works as deformation force, which influences in optical performance of the laser beam scanning device. Further, installation using the leaf springs and screws requires troublesome and time-consuming work.

SUMMARY OF THE INVENTION

It is therefore an object of the present invention to provide an improved installation of an optical component capable of avoiding the aforementioned problems and disadvantages encountered in the art.

For this purpose, according to the present invention, there is provided a structure for installing an optical component on a housing case, comprising a seating surface on said housing case for seating said optical component; and at least one fusible member arranged on said housing case adjacent to said seating surface, said fusible member having a vertical length enough to be beyond the top surface of said optical component seated on said seating surface, wherein at least a part of said fusible member is fused onto said optical component after said optical component is seated on said seating surface, thereby fixing said optical component onto said seating surface.

According to another aspect of the present invention, there is provided a process for installing an optical component on a housing case, comprising the steps of forming a reference surface on said housing case, to which one side of said optical component is to be abutted for positional regulation thereof; forming a fusible protrusion on said housing case at the position which is opposed to said reference surface, said fusible protrusion having a vertical length enough to be beyond the top surface of said optical component seated on said housing case; abutting one side of said optical component to said reference surface; fusing at least a part of said fusible protrusion onto said optical component with abutting said one side of the optical component to said reference surface; and letting the fused portion of said fusible protrusion be hardened for regulating the position of the other end of said optical component, whereby said optical component is fixed onto said housing case with regulating the posture of said optical component in the direction crossing to said reference surface.

The above, and other objects, features and advantages of the present invention will become apparent from the following detail description which is to be read in conjunction with the accompany drawings.

DESCRIPTION OF THE ACCOMPANYING DRAWINGS

FIGS. 9A through 9C are elevation views showing steps of fusing operation;

Figure 8:
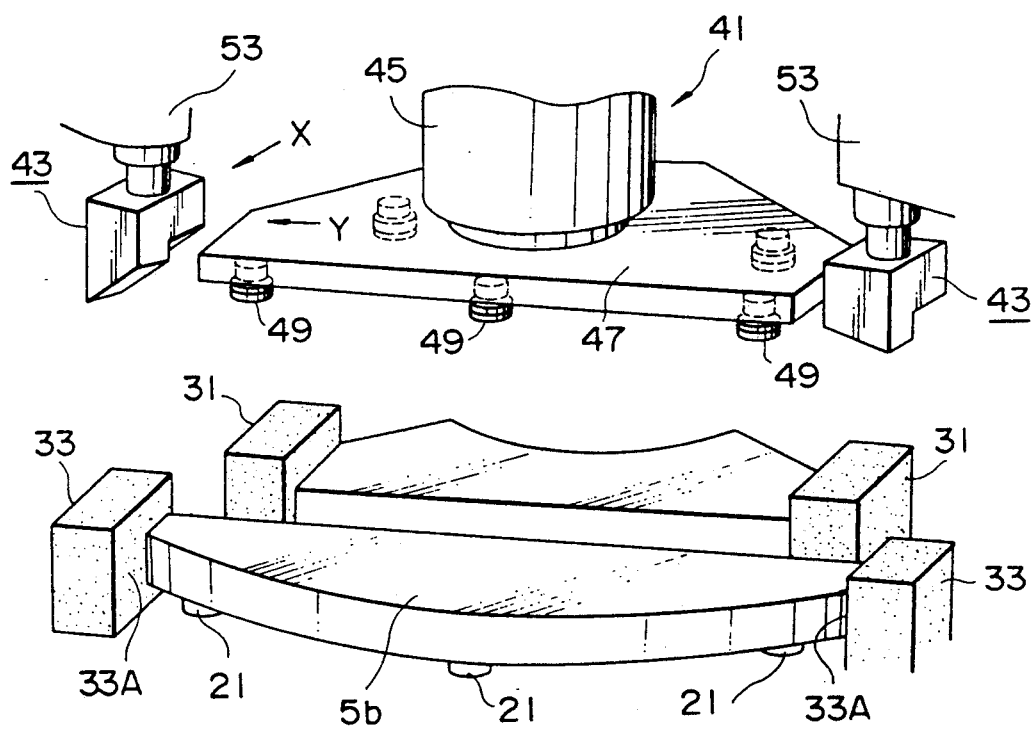
FIG. 8 is a perspective view showing one example of fusing operation.
Figure 12:
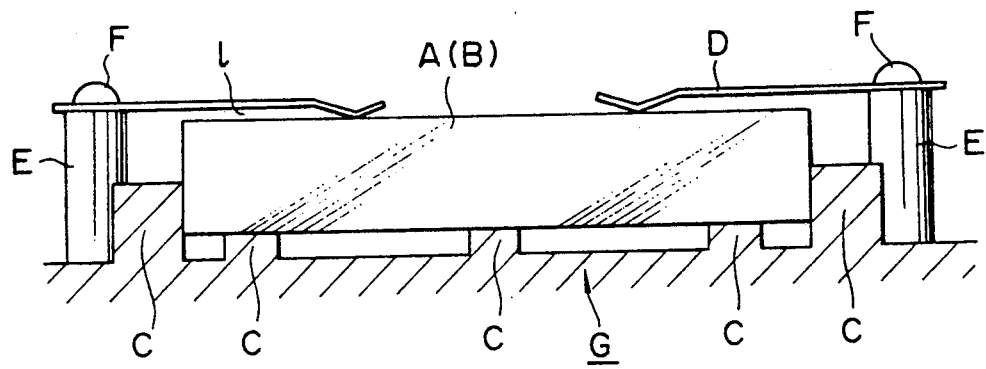
Figure 13:
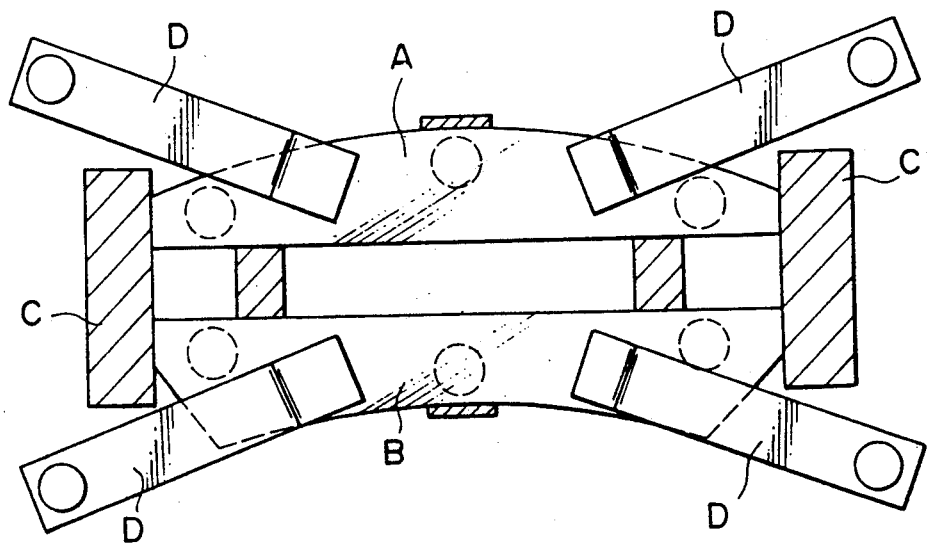

FIGS. 10A through 10C, and FIGS. 11A through 11C are enlarged views in the directions of X and Y in FIG. 8, respectively;

FIG. 12 is an elevation view showing a fixed condition of lenses in a conventional laser beam scanning device; and FIG. 13 is a plan view of FIG. 12.

DESCRIPTION OF THE EMBODIMENTS

Hereinafter, the embodiments of the present invention are explained in more detail by referring to accompanying drawings.

Figure 1:
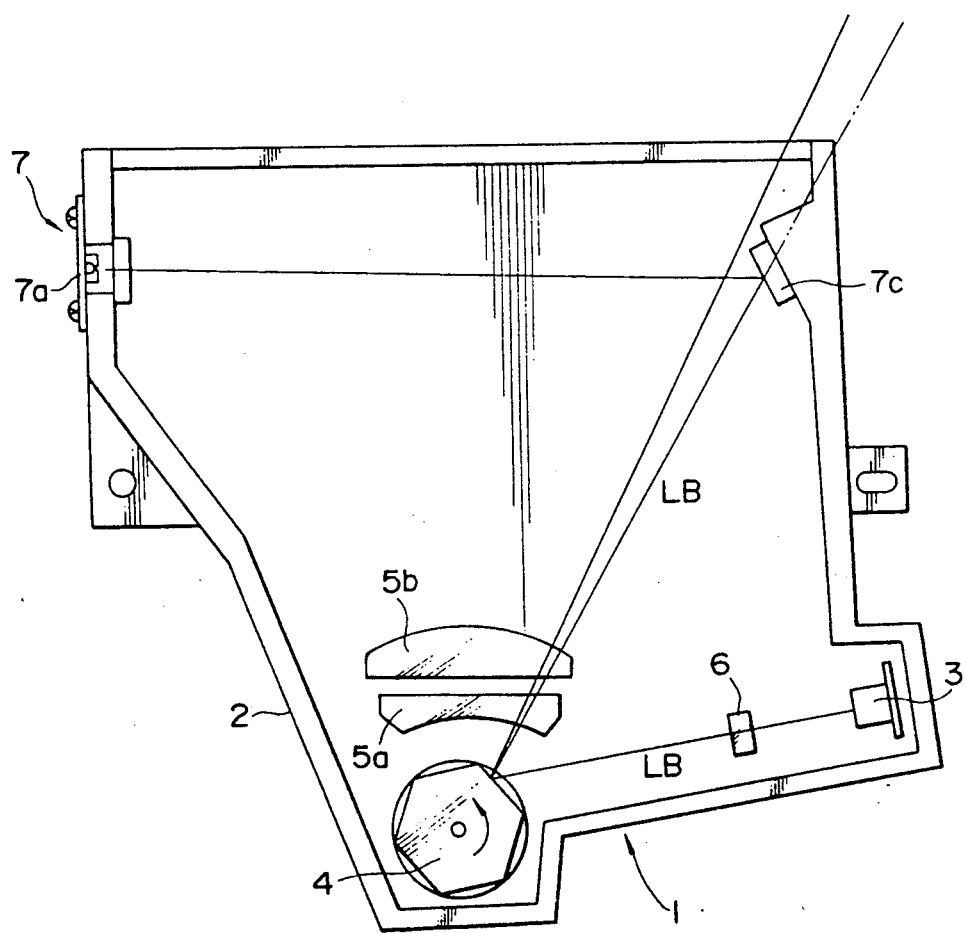
FIG. 1 is a plan view showing a laser beam scanning device to which the present invention is applied.
Figure 2:
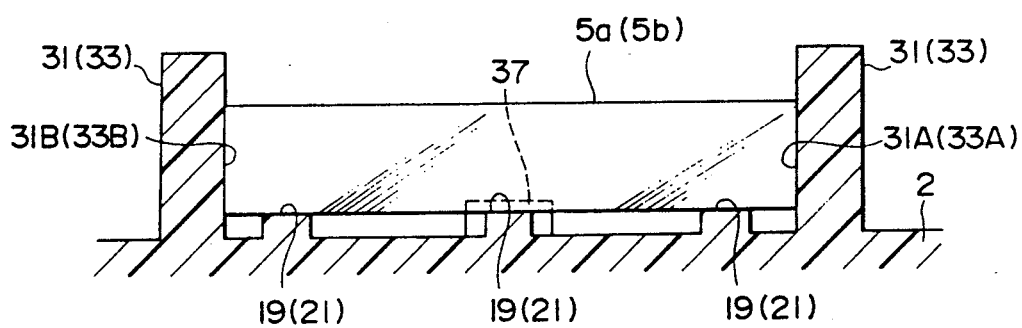
FIGS. 2 and 4 are elevation views showing a fixing process of lenses in the laser beam scanning device in accordance with an embodiment of the present invention.

FIG. 1 is a plan view showing an essential portion of a laser beam scanning apparatus embodying the invention, which is applied, for example, to a laser printer.

The illustrated laser beam scanning device comprises a housing case 2 and various optical components disposed thereon. The optical components are a laser unit 3 for emitting laser beam carrying optical image information, a light deflection means 4 for deflecting the emitted laser beam, an fθ having a pair of lenses 5a and 5b for making a scanning speed of the laser beam on an image-forming surface constant, a lens 6 for compensating tilt of the surface of the deflection means 4, a reflecting mirror 7c for reflecting the deflected laser beam, and a horizontal-sync signal generating unit 7 including a photo-sensor 7a which receives the beam reflected by the reflecting mirror 7c.

In this laser beam scanning device, the fθ lenses 5a and 5b are installed on the housing case 2 as illustrated in FIGS. 2 through 5.

Figure 3:
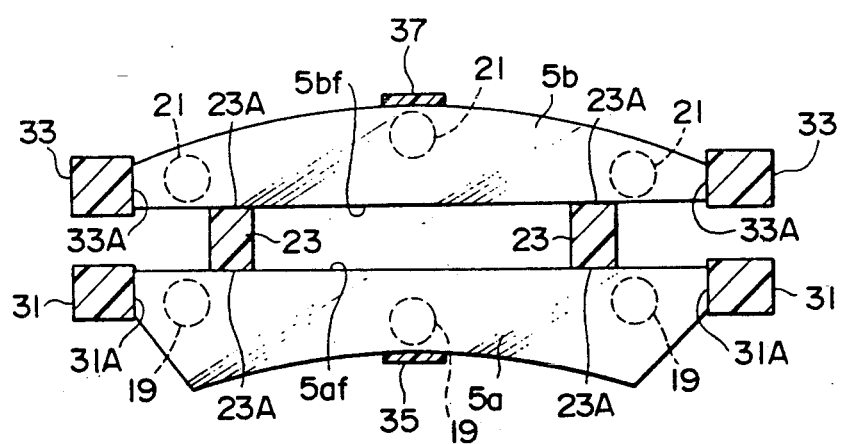
FIGS. 3 and 5 are plan views of FIGS. 2 and 4, respectively.

That is, the fθ lenses 5a and 5b are to be accurately disposed at predetermined positions with predetermined postures. So, as shown in FIG. 3, locations as well as postures thereof are regulated by a plurality of seating bosses 19 and 21, a pair of spacers 23 and 23, a pair of regulating lugs 35 and 37 which function in cooperation of the spacers 23 and 23 for regulating the postures of the fθ lenses 5a and 5b in the direction of optical path, and side post members 31 and 33.

The spacers 23 and 23 are provided with a plurality of reference surfaces 23A, to which the flat surfaces 5af and 5bf of the fθ lenses 5a and 5b are abutted. The side post members 31 and 33 are also provided with reference surfaces 31A and 33A, by abutting the side surfaces of the fθ lenses 5a and 5b to which, the postures of the fθ lenses 5a and 5b in the crossing direction of the optical path, are regulated. Each of the side post members 31 and 33 is formed in a rectangular-shaped and has a vertical length higher than the fθ lenses 5a and 5b if compared in the installed condition of the fθ lenses 5a and 5b.

Now, the installation of the fθ lens 5a and 5b onto the case 2 is explained in more detail.

First of all, the fθ lenses 5a and 5b are placed on the seating bosses 19 and 21 to be accurately positioned with predetermined postures by using the reference planes 23A, 31A and 33A.

Figure 4:
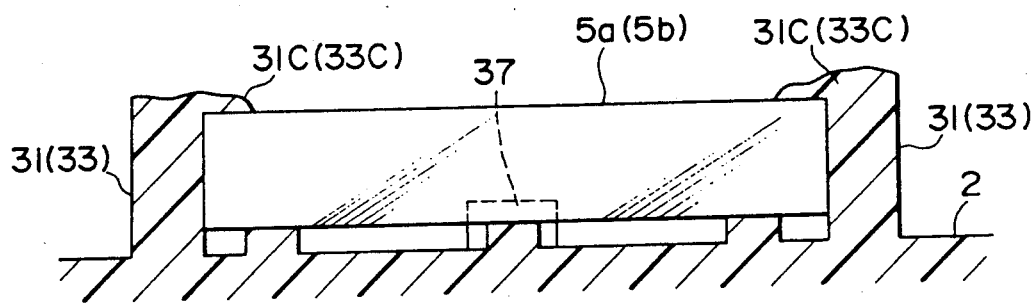
Figure 5:
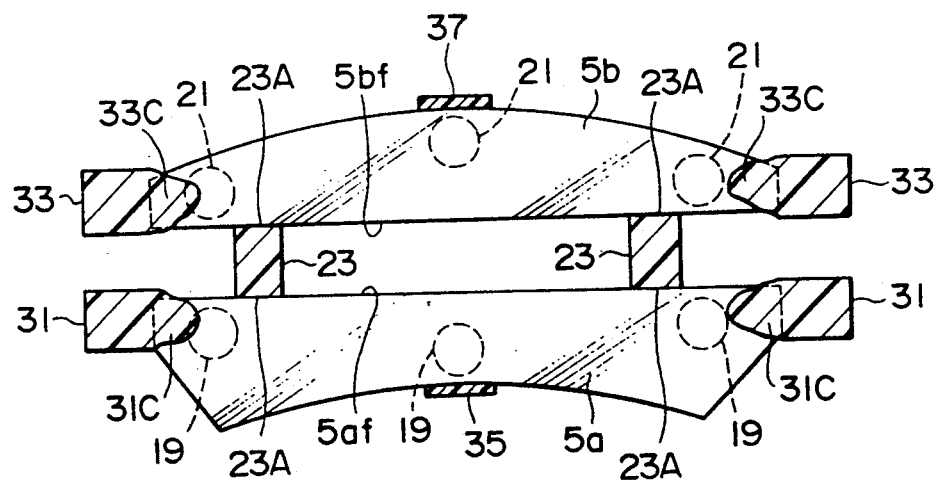

Then, a fusion welding tool, which will be described later, is utilized to fuse the top portion of the side post members 31 and 33 onto the upper surfaces of the fθ lenses 5a and 5b. After the proper amount of the side post members 31 and 33 are fused onto the fθ lenses 5a and 5b, the fusion welding tool is removed to lower the temperature of the fused portions 31C and 33C, as illustrated in FIGS. 4 and 5. When the temperature decreased under the fusing point, the fused portions 31C and 33C are hardened sufficient enough to fix the fθ lenses 5a and 5b rigidly on the seating bosses 19 and 21. Thus, the postures of the fθ lenses 5a and 5b are regulated, in the vertical direction, by the fused portions 31C and 33C of the side post members 31 and 33 in cooperation with the seating bosses 19 and 21.

As the fused portions 31C and 33C do not cause any stress against the fθ lenses 5a and 5b even after it is hardened rigidly, the fθ lenses 5a and 5b can be accurately and stably placed at their predetermined positions with predetermined postures without any possibility of deformation of the lenses 5a and 5b.

Figure 6:
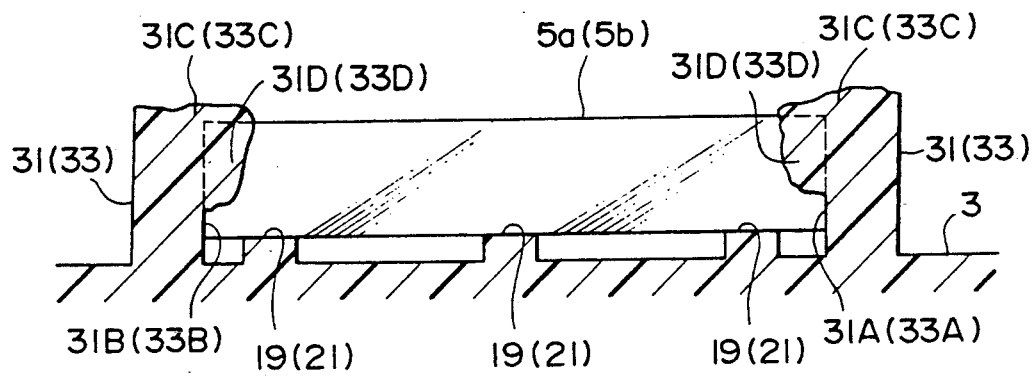
FIG. 6 is an elevation view showing another fixing process of lenses in the laser beam scanning device in accordance with a modified embodiment of the present invention.
Figure 7:
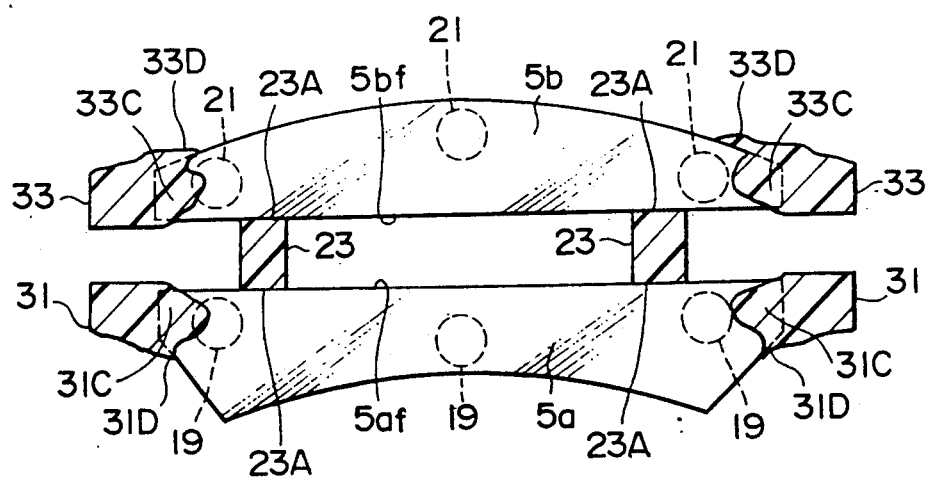
FIG. 7 is a plan view of FIG. 6.

FIGS. 6 and 7 show a modified embodiment wherein the regulating lugs 35 and 37 employed in the above first embodiment for regulating the postures of the fθ lenses 5a and 5b in the direction of the optical path are omitted.

In this modified embodiment, the side post members 31 and 33 are further fused to the rear surface of the fθ lens 5a as well as to the front surface of the fθ lens 5b, while the front surface of the fθ lens 5a and the rear surface of the fθ lens 5b are abutted to the reference surfaces 23A of the spacers 23. That is, the postures of the fθ lenses 5a and 5b in the direction of the optical path are regulated by fused portions 31D and 33D of the side post members 31 and 33 in cooperation with the spacers 23.

FIGS. 8 through 11 show the process of fusing the side post members 31 onto the fθ lenses 5b with a fusion welding tool. The illustrated fusion welding tool is one example, wherein the side post member 31 is fused onto the upper surface and one side surface of the fθ lens 5b, as illustrated in FIGS. 6 and 7.

Further, in this illustrated example, the side post member 31 is made of heat fusible material, and heat is applied thereto by a fusion welding tool.

As shown in FIG. 8, a fusion welding tool includes a presser 41 and a welder 43. The presser 41 comprises a lifter 45, a press plate 47 carried by the lifter 45 and a plurality of resilient members 49 attached to the press plate 47. The resilient members 49 are positioned to oppose to the seating bosses 21, respectively. The welder 43 is carried by a lifter 53.

First, the press plate 47 is moved downwardly, as illustrated in FIGS. 9A and 9B, until the resilient members 49 are compressed, so that the fθ lens 5b is firmly held between the resilient members 49 and the seating bosses 21. The welders 43 are then moved downwardly, as illustrated in FIG. 9C, until they contact the top portions of the side post members 33. The welders 43 are constituted to be moved up and down along guide bars 51, respectively, and the movable ranges thereof are regulated by stopper plates 51a of the guide bars 51. As shown in FIG. 9C, the welders 43 contact the side post members 33 before they reach the lower limits of their downward movements, as they are further moved downwardly when the top portion of the side post members 33 are fused.

FIGS. 10A through 10C, and FIGS. 11A through 11C are enlarged views in the directions of X and Y in FIG. 8, respectively.

Figure 10A:
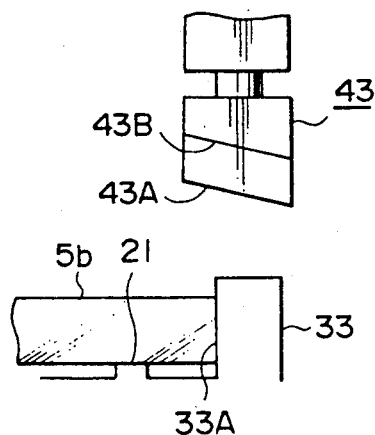

As shown in FIGS. 10A and 11A, each welder 43 is provided with a pair of first and second contact surfaces 43A and 43B. Both contact surfaces 43A and 43B are inclined in the same direction with the same inclination angle, but the first contact surface 43A is formed at a position lower and has a width smaller than those of the second contact surface 43B.

Figure 10B:
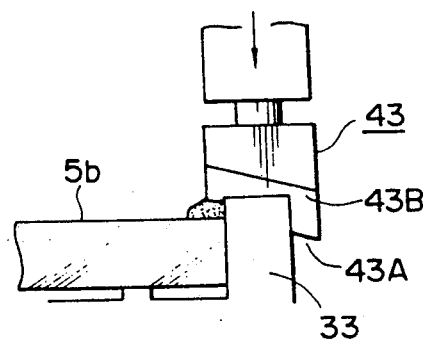
Figure 10C:
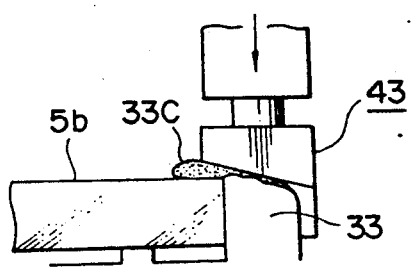

As shown in FIGS. 10B and 11B, when the welder 43 is moved downwardly, the first contact surface 43A contacts the top portion of the side post member 33 to fuse the contacted part. The welder 43 is gradually moved downwardly while partly fusing the side post member 33. After the welder 43 moved to the position where the second contact surface 43B contacts the side post member 33, the second contact surface 43B initiates fusing the contacted part of the side post member, as illustrated in FIGS. 10C and 11C. The portion 33E of the side post member 33 fused by the first contact surface 43A flows along one side surface of the fθ lens 5b, while the portion 33D fused by the second contact surface 43B flows along the upper surface of the fθ lens 5b.

Thus, by letting the fused portions 33D and 33E hardened, the fθ lens 5b is fixed to its predetermined position with the predetermined posture, as shown in FIGS. 6 and 7.

Although the pair of first and second contact surfaces 43A and 43B are formed on the welder 43 in the above embodiment, the first contact surface 43A can be omitted when employed in the embodiments shown in FIGS. 4 and 5.

Further, although the welder 43 is vertically moved in the above embodiment, it may be constituted to horizontally approach to the fθ lens 5b.

As to the welder 43, supersonic-wave welder can instead be employed.

As this invention may be embodied in several forms without departing from the spirit of essential characteristics thereof, the present embodiment is therefore illustrative and not restrictive, since the scope of the invention is defined by the appending claims rather than by the description preceding them, and all changes that fall within meets and bounds of the claims, or equivalence of such meets and bounds are therefore intended to embraced by the claims.

The present disclosure relates to subject matter contained in Japanese Patent Application No. HEI 2-238279 filed on Sep. 7, 1990, Which is expressly incorporated herein by reference in its entirety.

What is claimed is:

1. A structure for installing an optical component on a housing case, comprising:

a seating surface on said housing case for seating said optical component; and at least one fusible member arranged on said housing case adjacent to said seating surface, said fusible member having a vertical length enough to be beyond the top surface of said optical component when said optical component is seated on said seating surface, wherein at least a part of said fusible member is fused onto said optical component after said optical component is seated on said seating surface, thereby fixing said optical component onto said seating surface.

2. The structure according to claim 1, wherein said fusible member is fused when heat is applied thereto.

3. The structure according to claim 1, wherein said fusible member is provided with a reference surface, to which one surface of said optical component is abutted to regulate the posture of said optical component.

4. The structure according to claim 1, which further comprises a plurality of vertical protrusions formed on said housing case around said seating surface for regulating the position of said optical component in mutual cooperation thereof; and wherein said fusible member comprises one of said protrusions.

5. The structure according to claim 4, wherein said fusible member further comprises another one of said protrusions, said one and said another one of said protrusions being disposed at opposed sides of said optical component for regulating the posture of said optical component in one direction.

6. The structure according to claim 5, wherein the rest of said protrusions are disposed at such positions as to regulate the posture of said optical component in a direction transverse to said one direction.

7. A structure for installing at least a pair of optical components on a housing case, comprising:

a seating surface on said housing case for seating said pair of the optical component;

at least one spacer member provided on said seating surface for regulating the spacing between said pair of optical components in one direction;

a pair of fusible members arranged on said housing case adjacent to said seating surface, said fusible members having vertical lengths enough to be beyond the top surfaces of said optical components when said optical components are seated on said seating surface, wherein at least a part of respective fusible member is fused onto the corresponding one of said optical components after said corresponding optical component is seated on said seating surface, thereby fixing said optical components onto said seating surface.

8. The structure according to claim 7, wherein said fusible member is fused when heat is applied thereto.

9. The structure according to claim 7, wherein each of said fusible members is provided with a reference surface, to which one surface of the corresponding optical component is abutted to regulate the posture of said corresponding optical component.

10. The structure according to claim 7, which further comprises a plurality of vertical protrusions formed on said housing case around said seating surface for regulating the positions of said optical components in mutual cooperation thereof; and wherein each of said fusible members comprises one of said protrusions.

11. The structure according to claim 7 wherein said fusible members comprise a pair of protrusions, said pair of protrusions being disposed at opposed sides of said optical components for regulating the posture of said optical component in another direction transverse to said one direction.

12. The structure according to claim 11, wherein said fusible members further comprises protrusions in addition to said pair of protrusions and each one of said additional protrusions is disposed at such positions as to regulate the posture of said optical component in the direction transverse to said one direction in cooperation with said at-least-one spacing member.

13. The structure according to claim 11, wherein each of said pair of protrusions is further fused onto the side surface of the optical component so as to regulate the posture of the optical component in said another direction in cooperation with said spacer member.

14. The structure according to claim 1, wherein said housing case is a housing case of a light scanning device, and said optical component is a correction lens for correcting a scanning speed of light in said light scanning device.

15. A process for installing an optical component on a housing case, comprising the steps of:

forming a reference surface on said housing case, to which one side of said optical component is to be abutted for positional regulation thereof;

forming a fusible protrusion on said housing case at the position which is opposed to said reference surface, said fusible protrusion having a vertical length enough to be beyond the top surface of said optical component when said optical component is seated on said housing case;

abutting one side of said optical component to said reference surface;

fusing at least a part of said fusible protrusion onto said optical component with abutting said one side of the optical component to said reference surface; and letting the fused portion of said fusible protrusion be hardened for regulating the position of the other end of said optical component, whereby said optical component is fixed onto said housing case with regulating the posture of said optical component in a direction transverse to said reference surface.

16. The process according to claim 15, wherein heat is applied to fuse said fusible protrusion.

17. The process according to claim 15, wherein said fusible protrusion is provided with another reference surface, to which another side of said optical component is abutted to regulate the posture of said optical component before said fusible protrusion is fused.

18. The process according to claim 15, wherein another reference surface is formed on said housing case, to which another one side of said optical component is abutted, and another fusible protrusion is formed at a position opposed to said another reference surface; and wherein at least a part of said another fusible protrusion is fused onto said optical component for regulating a posture of said optical component in another direction transverse to said direction.

19. The process according to claim 18, wherein said another fusible protrusion is provided with an additional reference surface, to which another other side of the optical component is abutted to regulate the posture of said optical component.

20. The process according to claim 15, wherein said housing case is a housing case of a light scanning device, and said optical component is a correction lens for correcting a scanning speed of light.

* * * * *